US007367026B2

(12) United States Patent
Eichenberger et al.

(10) Patent No.: US 7,367,026 B2
(45) Date of Patent: *Apr. 29, 2008

(54) FRAMEWORK FOR INTEGRATED INTRA- AND INTER-LOOP AGGREGATION OF CONTIGUOUS MEMORY ACCESSES FOR SIMD VECTORIZATION

(75) Inventors: Alexandre E. Eichenberger, Chappaqua, NY (US); Kai-Ting Amy Wang, North York (CA); Peng Wu, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 543 days.

This patent is subject to a terminal disclaimer.

(21) Appl. No.: 10/919,115

(22) Filed: Aug. 16, 2004

(65) Prior Publication Data

US 2005/0283775 A1    Dec. 22, 2005

Related U.S. Application Data

(63) Continuation-in-part of application No. 10/862,483, filed on Jun. 7, 2004.

(51) Int. Cl.
*G06F 9/45* (2006.01)
*G06F 15/00* (2006.01)
*G06F 7/52* (2006.01)

(52) U.S. Cl. .............. 717/160; 717/151; 717/152; 717/159; 712/22; 708/650

(58) Field of Classification Search ........ 717/151–161; 712/21, 22; 708/650, 653
See application file for complete search history.

(56) References Cited

U.S. PATENT DOCUMENTS

| 4,710,872 A | * | 12/1987 | Scarborough | 717/160 |
| 5,247,645 A | * | 9/1993 | Mirza et al. | 711/5 |
| 5,349,665 A | * | 9/1994 | Endo | 717/160 |
| 5,440,687 A | * | 8/1995 | Coleman et al. | 709/236 |
| 5,522,074 A | * | 5/1996 | Endo | 717/150 |
| 5,802,375 A | * | 9/1998 | Ngo et al. | 717/160 |
| 5,933,650 A | | 8/1999 | van Hook et al. | 712/2 |
| 5,996,057 A | | 11/1999 | Scales, III et al. | 712/5 |

(Continued)

OTHER PUBLICATIONS

Arafeh, Bassel R., "Vectorization and parallelization interactive assistant," 1988, ACM, p. 573-577.*

(Continued)

*Primary Examiner*—Wei Zhen
*Assistant Examiner*—Qing Chen
(74) *Attorney, Agent, or Firm*—Van Leeuwen & Van Leeuwen; D'Ann N. Rifai

(57) ABSTRACT

A method, computer program product, and information handling system for generating loop code to execute on Single-Instruction Multiple-Datapath (SIMD) architectures, where the loop contains multiple non-stride-one memory accesses that operate over a contiguous stream of memory is disclosed. A preferred embodiment identifies groups of isomorphic statements within a loop body where the isomorphic statements operate over a contiguous stream of memory over the iteration of the loop. Those identified statements are then converted into virtual-length vector operations. Next, the hardware's available vector length is used to determine a number of virtual-length vectors to aggregate into a single vector operation for each iteration of the loop. Finally, the aggregated, vectorized loop code is converted into SIMD operations.

10 Claims, 5 Drawing Sheets

U.S. PATENT DOCUMENTS

| | | | |
|---|---|---|---|
| 6,113,650 A | 9/2000 | Sakai | 717/160 |
| 6,202,141 B1 | 3/2001 | Diefendorff et al. | 712/9 |
| 6,266,758 B1 | 7/2001 | van Hook et al. | 712/2 |
| 6,334,176 B1 | 12/2001 | Scales, III et al. | 712/4 |
| 6,484,255 B1 | 11/2002 | Dulong | 712/224 |
| 6,550,059 B1 | 4/2003 | Choe et al. | 717/159 |
| 7,020,873 B2* | 3/2006 | Bik et al. | 717/156 |
| 7,168,069 B1 | 1/2007 | Sigmund | 717/140 |
| 7,219,212 B1 | 5/2007 | Sanghavi et al. | 712/6 |
| 7,275,147 B2 | 9/2007 | Tavares | 712/224 |
| 2003/0120889 A1 | 6/2003 | Roussel et al. | 711/201 |
| 2003/0167460 A1* | 9/2003 | Desai et al. | 717/151 |
| 2003/0204840 A1* | 10/2003 | Wu | 717/158 |
| 2004/0001066 A1* | 1/2004 | Bik et al. | 345/505 |
| 2004/0003381 A1 | 1/2004 | Suzuki et al. | 717/150 |
| 2004/0006667 A1 | 1/2004 | Bik et al. | 711/100 |
| 2004/0098709 A1 | 5/2004 | Kyo | 717/140 |
| 2005/0097301 A1 | 5/2005 | Ben-David et al. | 712/22 |
| 2005/0289529 A1* | 12/2005 | Almog et al. | 717/158 |

OTHER PUBLICATIONS

McKenney et al., "Generating Parallel Code for SIMD Machines," 1992, ACM, p. 59-73.*

Pajuelo et al., "Speculative Dynamic Vectorization," 2002, IEEE, p. 271-280.*

Naishlos et al., "Vectorizing for a SIMdD DSP Architecture," 2003, ACM, p. 2-11.*

Lee et al., "Simple Vector Microprocessors for Multimedia Applications," *Proceedings of the 31st Annual International Symposium on Microarchitecture*, Dec. 1998 (12 pages).

Cheong et al., "An Optimizer for Multimedia Instruction Sets," Stanford University, Aug. 14, 1997.

Sreraman et al., "A Vectorizing Complier for Multimedia Extensions," *International Journal of Parallel Programming*, 2000 (40 pages).

Bik et al., "Automatic Intra-Register Vectorizatoin for the Intel Architecture," *International Journal of Parallel Programming*, vol. 30, No. 2, Apr. 2002 (p. 65-98).

Larsen et al., "Increasing and Detecting Memory Address Congruence," *Proceedings of the 11th International Conference on Parallel Architectures and Compilation Techniques*, Sep. 2002, 11 pages.

Naishlos, "Vectorizing for a SIMdD DSP Architecture," *Cases '03*, Oct. 30-Nov. 1, 2003, *ACM*, pp. 2-11.

Eichenberger et al., Vectorization for SIMD Architectures with Alignment Constraints, *PLDI'04*, Jun. 9-11, 204, p. 82-93.

Chatterjee et al., "Modeling Data-Parallel Programs with the Alignment-Distribution Graph," 6th *Annual Workshop on Languages and Compliers for Parallelism*, Aug. 1993, 28 pages.

Allen et al., "Automatic Translation of FORTRAN Programs to Vector Form," *ACM Transactions on Programming Languages and Systems*, v. 9, No. 4, Oct. 1987, p. 491-542.

*AltiVec™ Technology Programming Interface Manual*, 1999, 262 pages.

Krall et al., "Compilation Techniques for Multimedia Processors," International Journal of Parallel Programming, vol. 28, No. 4, pp. 347-361, 2000, http://citeseer.ist.psu.edu/krall00compilation.html.

O'Brien, "Predictive Commoning: A method of optimizing loops containing references to consecutive array elements," published by IBM Thomas J. Watson Research Center, Yorktown Heights, NY. Apr. 26, 1990, pp. 1-12.

Shin et al., "Compiler-Controlled Caching in Superword Register Files for Multimedia Extension Architectures," The Eleventh International Conference on Parallel Architectures and Compilation Techniques, Charlottesville, VA, Sep. 2002, pp. 1-11, http://moss.csc.ncsu.edu/pact02/papers/shin183.pdf.

Ren et al., "A Preliminary Study on the Vectorization of Multimedia Applications for Multimedia Extensions," published by Department of Computer Science, University of Illinois at Urbana Champaign, Urbana, IL and IBM T.J. Watson Research Center, Yorktown Heights, NY, 2003, pp. 1-15, http://citeseer.ist.psu.edu/ren03preliminary.html.

Cukic et al., "Automatic Array Alignment as a Step in Hierarchical Program Transformation," Apr. 1994, Proceedings of the Eighth International Parallel Processing Symposium.

Lee et al., "Automatic Data and Computation Decomposition on Distributed Memory Parallel Computers," Jan. 2002, ACM Transactions on Programming Languages and Systems, vol. 24, No. 1, pp. 1-50.

Scarborough et al., "A Vectorizing Fortran Compiler," Mar. 1986, IBM Journal of Research and Development, vol. 30, Issue 2, pp. 163-171.

Levine et al., "A Comparative Study of Automatic Vectorizing Compilers," 1991, Parallel Computing, vol. 17.

* cited by examiner

```
struct {
    int x;
    int y;
} a[N];

for(int i=0; i < N; i++) {
    a[i].x = 1;
    a[i].y = 1;
}
```
                    100
                102

Figure 1A

```
for(int i =0; i < N; i++) {
    a[2*i+2] = 1;
    a[2*i+3] = 2;
    b[i] = 3;
}
```
                    104
                106
            108

Figure 1B

```
for(int i=0; i < N; i+=3) {
    a[i] = 1;
    a[i+1] = 2;
    a[i+2] = 3;
}
```
                    110
                112
            114

Figure 1C

```
for(int i=0; i < N; i++) {
    for(int j=0; j < 1; j++) {
        a[i][j] = i;
    }
}
```
                118

Figure 1D

```
int a[3*N], b[N];
for(int i=0; i < N; i++) {
        a[3*i]   = 1;
        a[3*i+1] = 2;
        a[3*i+2] = 3;
        b[i+1] = 4;
}
```

Figure 2A

```
for(int i=0; i < N; i++) {
     a[3*i : 3*i+2] = {1, 2, 3};
     b[i+1] = 4;
}
```

Figure 2B

```
for(int i=0; i < N; i += 4) {
    a[3*i : 3*i+11] = {1,2 3, 1,2,3, 1,2,3, 1,2,3};
    b[i+1 : i+4] = {4, 4, 4, 4};
}
```

Figure 2C

```
for(int i=0; i < N; i += 4) {
    a[3*i   : 3*i+3]  = {1, 2, 3, 1};
    a[3*i+4 : 3*i+7]  = {2, 3, 1, 2};
    a[3*i+8 : 3*i+11] = {3, 1, 2, 3};
    b[i+1   : i+4]    = {4, 4, 4, 4};
}
```

FRAMEWORK FOR INTEGRATED INTRA- AND INTER-LOOP AGGREGATION OF CONTIGUOUS MEMORY ACCESSES FOR SIMD VECTORIZATION

CROSS-REFERENCE TO RELATED APPLICATIONS

This application is a continuation-in-part of commonly assigned, co-pending U.S. Non-Provisional patent application Ser. No. 10/862,483, entitled "SYSTEM AND METHOD FOR EFFICIENT DATA REORGANIZATION TO SATISFY DATA ALIGNMENT CONSTRAINTS," filing date Jun. 7, 2004, which is incorporated herein by reference. This application is also related to U.S. Non-Provisional patent application Ser. No. 10/919,131, entitled "SYSTEM AND METHOD FOR SIMD CODE GENERATION FOR LOOPS WITH MIXED DATA LENGTHS," U.S. Non-Provisional patent application Ser. No. 10/919,005, entitled "FRAMEWORK FOR GENERATING MIXED-MODE OPERATIONS IN LOOP-LEVEL SIMDIZATION," U.S. Non-Provisional patent application Ser. No. 10/918,996, entitled "SYSTEM AND METHOD FOR SIMD CODE GENERATION IN THE PRESENCE OF OPTIMIZED MISALIGNED DATA REORGANIZATION," and U.S. Non-Provisional patent application Ser. No. 10,918,879, entitled "FRAMEWORK FOR EFFICIENT CODE GENERATION USING LOOP PEELING FOR SIMD LOOP CODE WITH MULTIPLE MISALIGNED STATEMENTS," which are all filed even date hereof, assigned to the same assignee, and incorporated herein by reference.

BACKGROUND OF THE INVENTION

1. Technical Field

The present invention relates in general to a system and method for vectorizing loop code for execution on Single Instruction Multiple Datapath (SIMD) architectures that impose strict alignment constraints on the data.

2. Description of the Related Art

Multimedia extensions (MMEs) have become one of the most popular additions to general-purpose microprocessors. Existing multimedia extensions can be characterized as Single Instruction Multiple Datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. See, e.g., REN, Gang, et al. A Preliminary Study on the Vectorization of Multimedia Applications. In 16th International Workshop of Languages and Compilers for Parallel Computing. October 2003. To distinguish between the two types of vectorization, we refer to the latter as simdization. One such fundamental difference comes from the memory unit. The memory unit of a typical SIMD processor bears more resemblance to that of a wide scalar processor than to that of a traditional vector processor. In the ALTIVEC instruction set found on certain POWERPC microprocessors (produced by International Business Machines Corporation and Motorola, Inc.), for example, a load instruction loads 16-byte contiguous memory from 16-byte aligned memory, ignoring the last 4 bits of the memory address in the instruction. The same applies to store instructions. In this paper, architectures with alignment constraints refer to machines that support only loads and stores of register-length aligned memory.

There has been a recent spike of interest in compiler techniques to automatically extract SIMD parallelism from programs. See, e.g., LARSEN, Samuel, et al. Exploiting Superword Level Parallelism with Multimedia Instruction Sets. In *Proceedings of SIGPLAN Conference on Programming Language Design and Implementation*. June 2000, pp. 145-156; BIK, Aart, et al. Automatic Intra-Register Vectorization for the Intel Architecture. *Int. J. of Parallel Programming*. April 2002, vol. 30, no. 2, pp. 65-98; KRALL, Andreas, et al. Compilation Techniques for Multimedia Processors. *Int. J. of Parallel Programming*. August 2000, vol. 28, no. 4, pp. 347-361; SRERAMAN, N., et al. A Vectorizing Compiler for Multimedia Extensions. *Int. J. of Parallel Programming*, August 2000, vol. 28, no. 4, pp. 363-400; LEE, Corinna G., et al. Simple Vector Microprocessors for Multimedia Applications. In *Proceedings of International Symposium on Microarchitecture*. 1998, pp. 25-36; and NAISHLOS, Dorit, et al. Vectorizing for a SIMD DSP Architecture. In *Proceedings of International Conference on Compilers, Architectures, and Synthesis for Embedded Systems*. October 2003, pp. 2-11. This upsurge was driven by the increasing prevalence of SIMD architectures in multimedia processors. Two principal techniques have been used, the traditional loop-based vectorization pioneered for vector supercomputers (e.g., ALLEN, John Randal, et al. Automatic Translation of Fortran Programs to Vector Form. *ACM Transactions on Programming Languages and Systems*. October 1987, vol. 4, pp. 491-542; and ZIMA, Hans, et al. Supercompilers for Parallel and Vector Computers. Reading, MA: Addison-Wesley/ACM Press, 1990. ISBN 0201175606.) and the unroll-and-pack approach first proposed by Larsen and Amarasinghe in LARSEN, Samuel, et al. Exploiting Superword Level Parallelism with Multimedia Instruction Sets. In *Proceedings of SIGPLAN Conference on Programming Language Design and Implementation*. June 2000, pp. 145-156.

The simplest form of contiguous memory stream can be identified as a single stride-one memory access, for instance, a[i], where i is the counter of the surrounding loop and increments by 1. However, there are cases in which a contiguous memory stream is formed by a combination of non stride-one memory accesses. FIGS. 1A-1D provide four examples of such scenarios written in a C-like pseudocode.

In FIG. 1A, a loop that iterates over an array of structured data types or "structures" (e.g., "structs" in C or "records" in Pascal), where each of the structures has two fields. Although language syntax requires that a separate assignment statement be written for each field (thus creating two non-stride-one accesses in lines 100 and 102), the actual object code generated by the program fragment shown in FIG. 1A will result in assignments to a contiguous memory stream made up of elements of type "int," since each structure is simply a pair of adjacently-stored integers.

In FIG. 1B, a loop having mixed-stride memory accesses is depicted. Lines 104 and 106 access memory array "a" with two stride-two accesses, while line 108 accesses memory array "b" with a single stride-one access. Both the pair of lines 104 and 106 and line 108, however, operate over contiguous streams of memory over the iteration of the loop.

FIG. 1C depicts what may be described as a manually-unrolled loop. Lines 110, 112, and 114 are each stride-three memory accesses. However, over the iteration of the loop, lines 110, 112, and 114 operate over a contiguous stream of memory. The loop depicted in FIG. 1C may be characterized as being "manually-unrolled," since each of lines 110, 112, and 114 represent three iterations of a semantically-equivalent loop. For example, the loop in FIG. 1C could have been written as for(int *i*=0; *i*<*N*; *i*++) *a[i]*=(*i*% 3)+1;

where "%" represents the "modulo" or "remainder" operator, as in the C programming language. Loop unrolling is commonly used to speed up program code written for pipelined processors, where branch instructions may incur substantial performance penalties.

FIG. 1D depicts a nested pair of loops in which the inner loop has a short, known trip count. Although line 118, as written, relies on two index variables, "i" and "j," because the trip count of the inner loop is known, line 118 could be unrolled into a semantically equivalent loop of the form shown in FIG. 1C.

A number of techniques have been proposed to allow multiple non-stride-one accesses over contiguous memory streams to be aggregated into stride-one memory accesses. Among these are "loop rerolling," "loop collapsing," and "loop unroll-and-pack."

"Loop rerolling," utilized in the aforementioned VAST compiler, rerolls isomorphic statements with adjacent memory accesses into a loop where all accesses in the statements are stride-one. A major drawback of this approach is that loop rerolling introduces a new innermost loop to the enclosing loop net, thus making the original innermost loop not innermost any more. Since simdization usually happens at the innermost loop only, rerolling reduces the scope of simdization. Further, loop rerolling requires the presence of a loop counter for the innermost loop, so it cannot reroll loops such as in FIG. 1A, where the individual memory accesses are addressed by fields in a structure, rather than by an array index.

"Loop collapsing" is described in SMITH, Kevin et al. Support for the Intel Pentium 4 Processor with Hyper-Threading Technology in Intel 8.0 Compilers. In *Intel Technology Journal*, Feb. 18, 2004. In "loop collapsing," isomorphic statements are first virtually rerolled into a loop. Then, the rerolled loop is collapsed into the innermost surrounding loop. A drawback of this technique is that loop collapsing must virtually reroll all statements in the original innermost loop. Thus, loop collapsing cannot collapse loops such as in FIG. 1B, where there are mixed-stride accesses.

"Loop unroll-and-pack" is described in LARSEN, Samuel, et al. Exploiting Superword Level Parallelism with Multimedia Instruction Sets. In *Proceedings of SIGPLAN Conference on Programming Language Design and Implementation*. June 2000, pp. 145-156. This technique finds SIMD parallelism within a basic block (and is thus limited to an iteration of a loop) by packing isomorphic operations on adjacent memory accesses to SIMD instructions. A drawback of this approach is that it does not explore the contiguous memory stream across iterations. Thus, it can be very inefficient in handling misaligned memory accesses. Another drawback of this approach is that it may require additional loop unrolling to be effective.

In published patent application US 20040006667 (Bik et al.) Jan. 8, 2004, a technique is disclosed whereby non-unit-stride memory accesses are packed into vectors using "gather" and "scatter" instructions. Gather and scatter instructions are commonly found on traditional vector and SIMD architectures and are used to pack and unpack values to and from a vector representation in the processor. The inclusion of additional gather, scatter, and shuffle instructions into the loop body, as in the BIK application, limits the performance attainable by this method. Moreover, the BIK application's technique requires that the vectors in question be of a size that is a multiple of the physical vector size, which may force a compiler to perform an unnecessary degree of loop unrolling. Finally, the BIK reference fails to recognize that certain groups of adjacent non-unit-stride memory accesses may in fact be equivalent to an iterated unit-stride memory access; this causes the BIK simdization method to introduce unnecessary gather, scatter, and shuffle instructions in certain instances.

Thus, what is needed is an efficient, general-purpose scheme for aggregating multiple non-stride-one memory references into simdized code. The present invention provides a solution to these and other problems, and offers other advantages over previous solutions.

SUMMARY

A preferred embodiment of the present invention provides a method, computer program product, and information handling system for generating loop code to execute on Single-Instruction Multiple-Datapath (SIMD) architectures, where the loop contains multiple non-stride-one memory accesses that operate over a contiguous stream of memory. A preferred embodiment identifies groups of isomorphic statements within a loop body where the isomorphic statements operate over a contiguous stream of memory over the iteration of the loop. Those identified statements are then converted into a single statement that operates on vectors of a certain length. The length of the vector is determined by the data type of the original scalar operation and the number of statements being aggregated. Since this length does not necessarily match the physical vector length, we refer to such vectors as virtual-length vectors. Next, the virtual-length vectors computed from the previous step are further aggregated, across iterations, into virtual-length vectors that are of a size that is a multiple of the physical vector length. Then, operations on virtual-length vectors are "de-virtualized" into operations on multiple physical-length vectors. Finally, operations on physical vectors are converted into SIMD operations.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 1A-1D are diagrams of pseudocode illustrating various types of loops in which non-stride-one memory accesses are used to access a contiguous stream of memory;

FIGS. 2A-2D are diagrams illustrating the progression of a memory access aggregation process on a loop in accordance with a preferred embodiment of the present invention;

DETAILED DESCRIPTION

Figure 3:
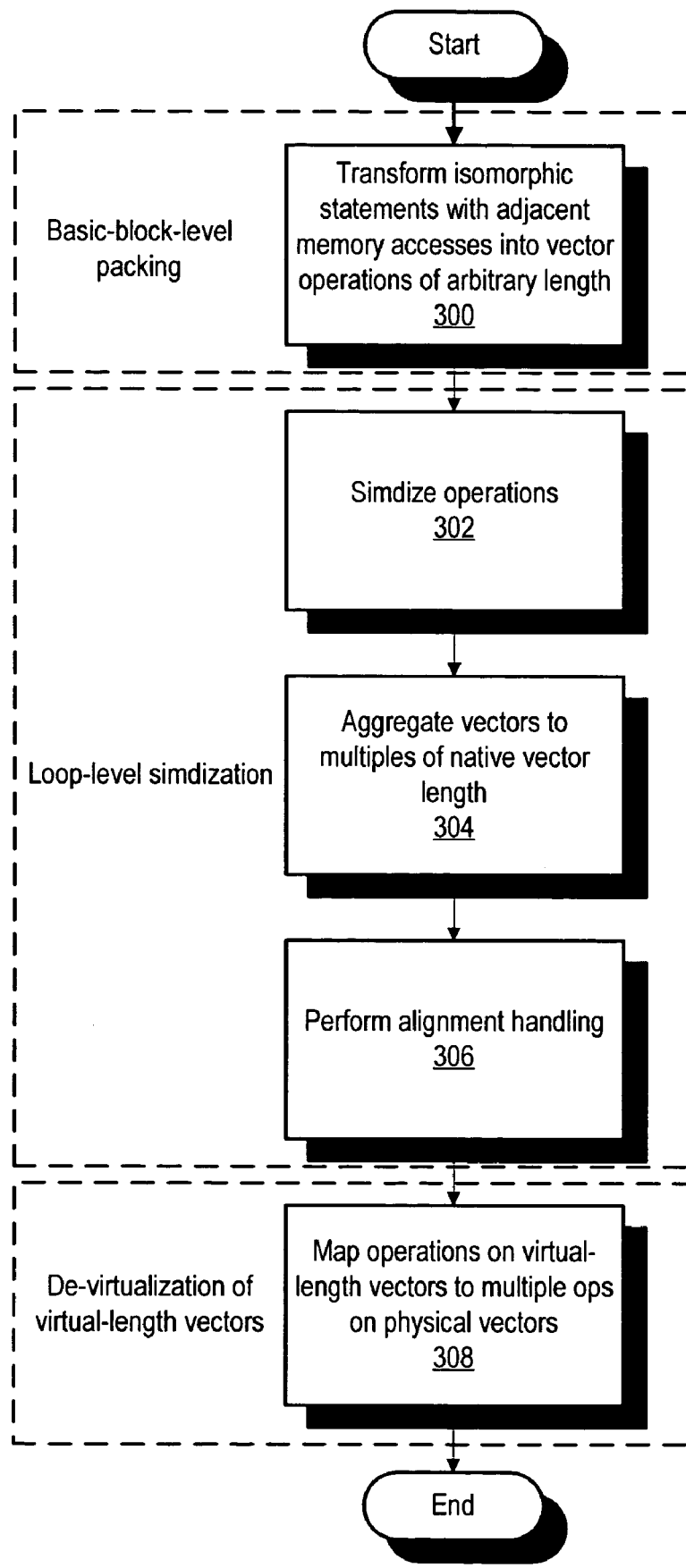
FIG. 3 is a flowchart representation of a process of aggregating memory accesses into vector instructions in accordance with a preferred embodiment of the present invention.

The following is intended to provide a detailed description of an example of the invention and should not be taken to be limiting of the invention itself. Rather, any number of variations may fall within the scope of the invention, which is defined in the claims following the description.

The process of memory access aggregation applied by a preferred embodiment of the present invention is now illustrated here by way of an example. FIG. 2A illustrates a loop in a C-like pseudocode to which memory access aggregation will be applied. Lines 200, 202, and 204 are stride-three accesses that operate over a contiguous stream of memory. Line 206 is a stride-one access over a different contiguous stream of memory.

The first stage of the aggregation process is to identify groups of isomorphic statements having adjacent memory accesses. A set of statements is isomorphic if all of the statements may be compiled into a set of instructions that differ only in the data values that are operated upon by those instructions. In FIG. 2A, lines 200, 202, and 204 form such an isomorphic set, since each of lines 200, 202, and 204 assigns a constant to a variable. In other cases, the isomorphism between statements may be less obvious. For example, a statement that subtracts a constant from a variable is isomorphic to another statement that adds a constant to a variable, since the subtraction may be compiled into an addition instruction that adds a negative number.

Once a set of isomorphic statements has been identified, that set of isomorphic statements is transformed into a single statement that operates on vectors instead of scalars. This may be referred to a "basic-block-level packing," since a basic block of isomorphic statements in the body of a loop is packed into a single vectorized statement without modifying the loop control code. FIG. 2B shows the result of applying such a transformation to the loop depicted in FIG. 2A. Lines 200, 202, and 204 in FIG. 2A are replaced with a single line of vectorized code, line 208. (In the pseudocode notation adopted here, the array expression "a[3*i: 3*i+2]" refers to a slice of array "a" comprising elements a[3*i] through a[3*i+2].) Line 208 sets array elements a[3*i] through a[3*i+2] to the values 1, 2, and 3, respectively. Line 206 remains unchanged in FIG. 2B, due to the fact that line 206 was already a stride-one memory access.

Next, stride-one accesses are further aggregated across iterations by blocking the loop. Specifically, the blocking factor (i.e., number of loop iterations per vector) is chosen so that each vector in the vectorized code has a length that is a multiple of the native (hardware) vector length. The blocking factor is computed as $$BlockingFactor = VL/gcd(len_1, len_2, K, len_n, VL)$$

where VL is the native vector length, gcd stands for "greatest common divisor" (also referred to as "greatest common factor"), and $len_1$, $len_2$, K, $len_n$ are the data lengths used in the loop body.

For the purposes of the example provided in FIGS. 2A-2C, we will assume that the underlying SIMD hardware provides for a 16-byte-wide native vector length. We will also assume that the "int" data type refers to a 32-bit (or 4-byte-wide) integer, as is the case with most modern C compilers today. Then the blocking factor for the loop in FIG. 2B is computed as $$BlockingFactor = 16/gcd(12,4,16) = 16/4 = 4.$$

Thus, the loop in FIG. 2B will be blocked so that each vector operation represents 4 iterations of the original loop. This result is shown in FIG. 2C, where the loop is modified so that the index variable "i" increments by 4 (line 212) at each iteration of the loop. Lines 214 and 216 replace lines 208 and 206, respectively. Line 214 stores a vector of 12 values that represents four iterations of line 208 in FIG. 2B into a 48-byte (12-element) slice of array "a". Similarly line 216 stores a vector of 4 values, representing four iterations of line 206 in FIG. 2B, into a 16-byte (4-element) slice of array "b."

Once the loop has been blocked, alignment handling may be applied to the loop-level simdized loop to address any misalignments between data streams referenced in the loop. A number of techniques for performing alignment handling are described in the incorporated applications referred to in the "CROSS-REFERENCE TO RELATED APPLICATIONS" section above.

It should be noted that loop-level simdization results in operations over virtual-length vectors, and not the actual physical vectors, whose length is strictly determined by the hardware. Each loop-body operation resulting from loop-level simdization must be de-virtualized into one or more vector operations having a length that is limited by the actual hardware vector length. The result of this de-virtualization on the loop depicted in FIG. 2C is shown in FIG. 2D. Line 214 of FIG. 2C, which was a 48-byte (12 integers of 4 bytes each) virtual vector operation, is now replaced with lines 218. Lines 218 is a group of three 16-byte vector operations that together perform the job of the virtual vector operation on line 214 of FIG. 2C. Since loop-level simdization results in virtual-length vector operations having vector lengths that are a multiple of the hardware vector length, each virtual-length vector operation is readily de-virtualized into an integer number of physical vector operations. Note that line 216 from FIG. 2C remains unchanged in FIG. 2D, since line 216 was already a 16-byte vector operation.

FIG. 3 is a flowchart representation of a process of aggregating memory accesses into vector instructions in accordance with a preferred embodiment of the present invention. A set of isomorphic statements operating on adjacent memory accesses is identified and transformed into vector operations operating on vectors having arbitrary lengths (block 300). These vector operations are simdized (block 302). The vectors operated upon by the vector operations are then aggregated to form virtual-length vector operations having vector lengths that are multiples of the native vector length (block 304). Alignment handling is applied to address any misalignments between data streams referred to in the loop (block 306). Finally, each virtual-length vector operation is de-virtualized into one or more native-length vector operations, according to the constraints of the hardware (block 308).

Figure 4:
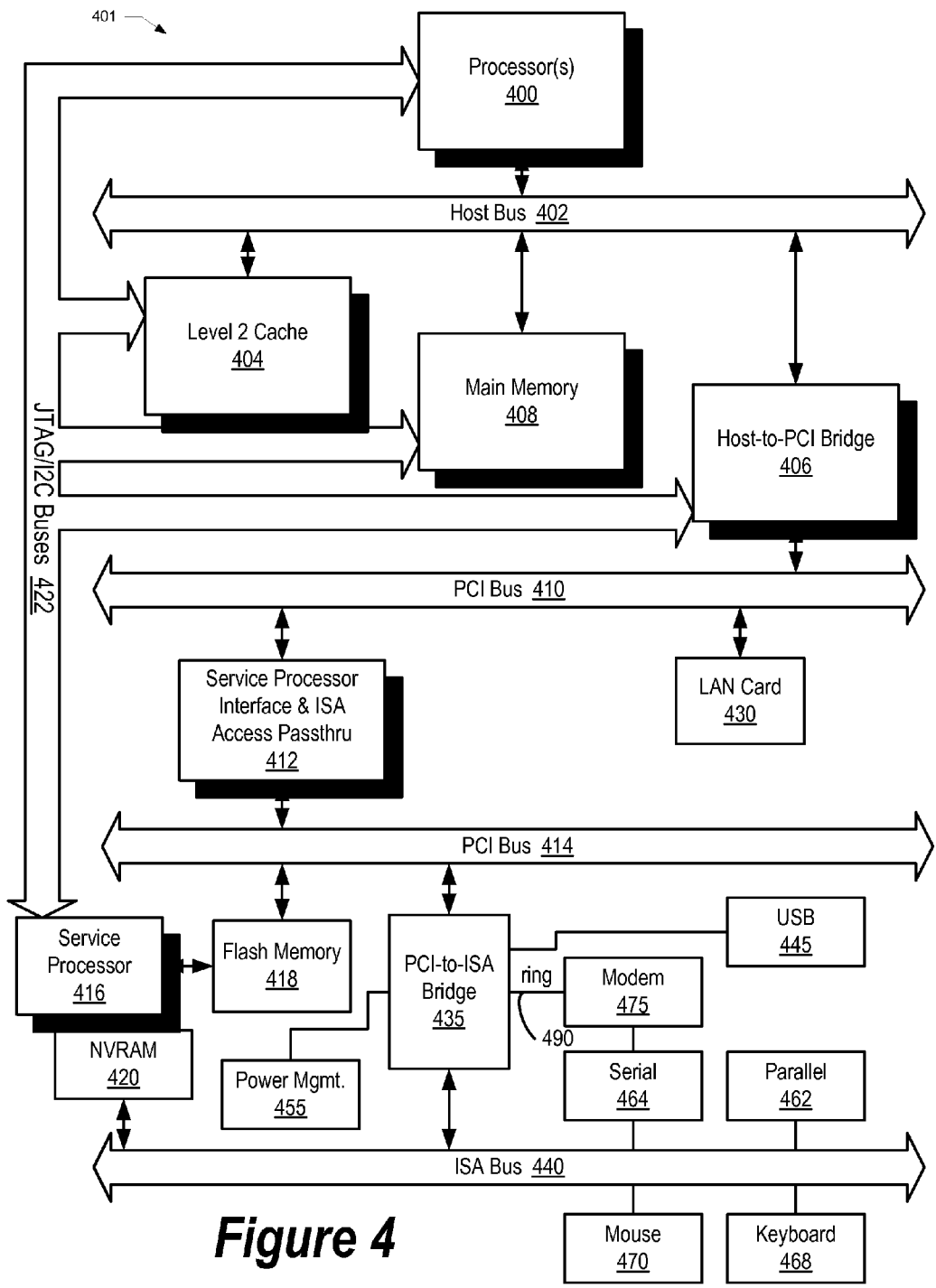
FIG. 4 is a block diagram of a computing device capable of implementing the present invention.

FIG. 4 illustrates information handling system 401 which is a simplified example of a computer system capable of performing the computing operations described herein. Computer system 401 includes processor 400 which is coupled to host bus 402. A level two (L2) cache memory 404 is also coupled to host bus 402. Host-to-PCI bridge 406 is coupled to main memory 408, includes cache memory and main memory control functions, and provides bus control to handle transfers among PCI bus 410, processor 400, L2 cache 404, main memory 408, and host bus 402. Main memory 408 is coupled to Host-to-PCI bridge 406 as well as host bus 402. Devices used solely by host processor(s) 400, such as LAN card 430, are coupled to PCI bus 410. Service Processor Interface and ISA Access Pass-through 412 provides an interface between PCI bus 410 and PCI bus 414. In this manner, PCI bus 414 is insulated from PCI bus 410. Devices, such as flash memory 418, are coupled to PCI bus 414. In one implementation, flash memory 418 includes BIOS code that incorporates the necessary processor executable code for a variety of low-level system functions and system boot functions.

PCI bus 414 provides an interface for a variety of devices that are shared by host processor(s) 400 and Service Processor 416 including, for example, flash memory 418. PCI-to-ISA bridge 435 provides bus control to handle transfers between PCI bus 414 and ISA bus 440, universal serial bus (USB) functionality 445, power management functionality 455, and can include other functional elements not shown, such as a real-time clock (RTC), DMA control, interrupt support, and system management bus support. Nonvolatile RAM 420 is attached to ISA Bus 440. Service Processor 416 includes JTAG and I2C buses 422 for communication with processor(s) 400 during initialization steps. JTAG/I2C buses 422 are also coupled to L2 cache 404, Host-to-PCI bridge 406, and main memory 408 providing a communications path between the processor, the Service Processor, the L2 cache, the Host-to-PCI bridge, and the main memory. Service Processor 416 also has access to system power resources for powering down computer system 401.

Peripheral devices and input/output (I/O) devices can be attached to various interfaces (e.g., parallel interface 462, serial interface 464, keyboard interface 468, and mouse interface 470 coupled to ISA bus 440. Alternatively, many I/O devices can be accommodated by a super I/O controller (not shown) attached to ISA bus 440.

In order to attach computer system 401 to another computer system to copy files over a network, LAN card 430 is coupled to PCI bus 410. Similarly, to connect computer system 401 to an ISP to connect to the Internet using a telephone line connection, modem 475 is connected to serial port 464 and PCI-to-ISA Bridge 435 via ring signal 490.

While the computer system described in FIG. 4 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer program product stored on a computer storage medium, the computer storage medium containing instructions for execution by a computer, which, when executed by the computer, cause the computer to implement a method of generating code, the method comprising:
   identifying a loop within a piece of program code;
   identifying, within a body of the loop, a plurality of isomorphic statements having adjacent memory accesses;
   transforming the plurality of isomorphic statements into one or more vector operations;
   calculating a blocking factor n, wherein the blocking factor n is calculated as a quotient having a dividend that is an available hardware vector length and having a divisor that is a greatest-common-divisor of a set of numbers that includes each vector length in the one or more vector operations and the available hardware vector length;
   aggregating n vectors across iterations in each of the one or more vector operations into one or more virtual-length vector operations such that the one or more virtual-length vector operations have lengths that are multiples of the available hardware vector length; and
   generating single-instruction multiple-datapath (SIMD) code by de-virtualizing the one or more virtual-length vector operations to obtain one or more physical-length vector operations that correspond to the available hardware vector length.

2. The computer program product of claim 1 wherein the method further comprises:

identifying that, over a complete course of execution of the loop, the plurality of isomorphic statements operate over a contiguous stream of memory.

3. The computer program product of claim 1, wherein the generation of the single-instruction multiple-datapath (SIMD) code from the one or more vector operations includes generating a data reorganization graph.

4. The computer program product of claim 3 wherein the method further comprises:

applying stream-shifting operations to the data reorganization graph to handle misalignments between data streams operated upon in the one or more vector operations.

5. The computer program of claim 4 wherein the method further comprises:

applying a simdization policy to the data reorganization graph, wherein the simdization policy is one of a zero shift policy, an eager shift policy, a lazy shift policy, and a dominant shift policy.

6. An information-handling system comprising:

at least one processor;

one or more data storage units accessible by the at least one processor; and functional descriptive material contained within the data storage units that, when executed by the at least one processor, directs the at least one processor to perform actions of:

identifying a loop within a piece of program code;

identifying, within a body of the loop, a plurality of isomorphic statements having adjacent memory accesses;

transforming the plurality of isomorphic statements into one or more vector operations;

calculating a blocking factor n, wherein the blocking factor n is calculated as a quotient having a dividend that is an available hardware vector length and having a divisor that is a greatest-common-divisor of a set of numbers that includes each vector length in the one or more vector operations and the available hardware vector length;

aggregating n vectors across iterations in each of the one or more vector operations into one or more virtual-length vector operations such that the one or more virtual-length vector operations have lengths that are multiples of the available hardware vector length; and generating single-instruction multiple-datapath (SIMD) code by de-virtualizing the one or more virtual-length vector operations to obtain one or more physical-length vector operations that correspond to the available hardware vector length.

7. The information-handling system of claim 6, comprising additional functional descriptive material that, when executed by the at least one processor, directs the at least one processor to perform actions of:

identifying that, over a complete course of execution of the loop, the plurality of isomorphic statements operate over a contiguous stream of memory.

8. The information-handling system of claim 6, wherein the generation of the single-instruction multiple-datapath (SIMD) code from the one or more vector operations includes generating a data reorganization graph.

9. The information-handling system of claim 8, comprising additional functional descriptive material that, when executed by the at least one processor, directs the at least one processor to perform actions of:

applying stream-shifting operations to the data reorganization graph to handle misalignments between data streams operated upon in the one or more vector operations.

10. The information-handling system of claim 6, wherein transforming the plurality of isomorphic statements into the one or more vector operations includes:

transforming the plurality of isomorphic statements into one or more virtual-length vector operations; and de-virtualizing the one or more virtual-length vector operations to obtain one or more physical-length vector operations.

* * * * *